UNITED STATES PATENT OFFICE.

JOHN WILLIAM BEAR AND JEREMIAH FRANKLIN THOMAS, OF CLIFTON FORGE, VIRGINIA.

ALUMINUM-SOLDERING FLUX.

1,259,590.  Specification of Letters Patent.  Patented Mar. 19, 1918.

No Drawing.  Application filed April 19, 1917. Serial No. 163,224.

*To all whom it may concern:*

Be it known that we, JOHN W. BEAR and JEREMIAH F. THOMAS, citizens of the United States of America, residing at Clifton Forge, in the county of Alleghany and State of Virginia, have invented certain new and useful Improvements in Aluminum-Soldering Flux, of which the following is a specification.

This invention relates to an aluminum flux for soldering and has for its object the production of a compound, which, when used with a substantially equal part of common solder, will constitute a flux for tightly soldering any kind of aluminum metal and also weld aluminum under the "blow pipe process."

The composition is composed of mercury, chalk, spirits of turpentine and olive oil.

In preparing the composition it is intended to use the ingredients in approximately the following proportions—viz., five ounces of mercury, chalk in sufficient quantity to thicken the mercury, one tablespoonful of spirits of turpentine and one pint of olive oil.

While most efficient results are obtained by compounding the composition in the quantities above given, good results may be obtained when the quantities of the ingredients are varied within reasonable limits, although it is, of course, obvious that all the constituent elements are essential to complete production of the soldering flux.

After this compound has been mixed as hereinbefore specified, it is in condition to be used in equal proportions with common solder for soldering all kinds of aluminum metal and also weld aluminum under the "blow pipe process."

In mixing the ingredients above specified the mercury thickened with chalk, as well as the turpentine and olive oil are all placed within a bottle or other suitable vessel and are shaken well before using. While agitated in this condition the compound is applied to the article to be mended. At this time the compound forms a lead gray liquid. The olive oil is included to so smother the air as to enable the solder to take hold of the aluminum.

After the compound has been used and is still the mercury chalk will settle to the bottom of the bottle or vessel thus necessitating the shaking of the bottle or other vessel again before using.

What is claimed is:

1. An aluminum flux for soldering and welding aluminum, comprising mercury, chalk, spirits of turpentine and olive oil.

2. An aluminum flux for soldering and welding aluminum, comprising substantially five ounces of mercury thickened with chalk, substantially one tablespoonful of spirits of turpentine, and substantially one pint of olive oil.

3. An aluminum flux for soldering and welding aluminum comprising substantially five ounces of mercury thickened with chalk, substantially one tablespoonful of spirits of turpentine, and substantially one pint of olive oil to be used in substantially equal parts with common solder.

In testimony whereof we hereunto affix our signatures.

JOHN WILLIAM BEAR.
JEREMIAH FRANKLIN THOMAS.